Patented Sept. 26, 1939

2,174,412

UNITED STATES PATENT OFFICE 2,174,412

GOLD COMPOUNDS OF DISULPHIDE-ACYL-ALKYLGLUCAMIDES AND A PROCESS OF PREPARING SAME

Max Bockmühl and Gustav Ehrhart, Frankfort-on-the-Main-Höchst, Germany, assignors to Winthrop Chemical Company, Inc., New York, N. Y., a corporation of New York No Drawing. Application October 26, 1936, Serial No. 107,746. In Germany October 30, 1935

7 Claims. (Cl. 260—211)

The present invention relates to gold compounds of disulphide-acylalkylglucamides and to a process of preparing same.

As is known the gold compounds used in therapeutics are prepared by reaction between gold salts and sulphur compounds which contain the sulphur in the sulphhydryl form or wherein the sulphur can be changed into such a form by a tautomerization. This mode of preparation is based on the observation that the metal can enter into the organic molecule only when a suitable group for binding the metal is contained therein, i. e. the mercapto group.

Now we have found that organic gold compounds can also be obtained by reaction between gold salts and organic sulphur compounds of the following general formula:

$$\begin{array}{c} S-X \\ | \\ S-Y \end{array}$$

wherein X and Y stand for organic residues. As gold salts there may especially be used auric chloride, auric bromide or potassium aurichloride. The process may be carried out by causing a gold salt, for instance, auric chloride in an aqueous solution to act upon a compound of the following formula:

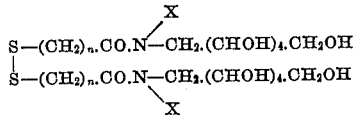

wherein $n$ stands for a low whole number and X stands for hydrogen or a lower alkyl.

The compounds of the following formula:

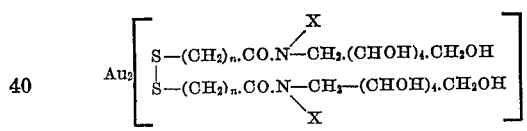

wherein $n$ stands for a low whole number and X stands for hydrogen or a lower alkyl, obtainable by this process are light yellow powders readily soluble in water but insoluble in ether; they are for use in therapeutics.

The following examples serve to illustrate the invention but they are not intended to limit it thereto:

(1) 27 grams of chloroacetyl-methylglucamide of the formula:

CH$_2$ClCON—CH$_3$CH$_2$(CHOH)$_4$CH$_2$OH dissolved in 100 cc. of methylalcohol are mixed with a solution of potassium-disulphide prepared from 5.5 grams of potassium-methylate and the mixture is boiled for 4 to 5 hours in a reflux apparatus. The potassium chloride which has separated is filtered and the filtrate is dried in a vacuum. A viscous, thick oil is obtained which can be further used without a further purification.

3.4 grams of disulphide-acetyl-methylglucamide of the formula:

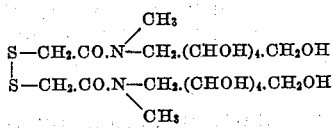

are dissolved in 10 cc. of water and a solution of 1.7 grams of auric chloride in 5 cc. of water is added. The preliminary dark color rapidly becomes lighter. The whole is still heated for a short time to 40° C. to 50° C. on the steam bath, filtered until it is entirely clear and the filtrate poured, while stirring, into about 150 cc. of alcohol. The new gold compound which separates is filtered with suction, dissolved once more in a small quantity of water and again separated by stirring the solution, into alcohol, it is then filtered with suction and washed with alcohol and ether. The yield amounts to 1.8 grams.

The chloracetyl methylglucamide is obtained in the following manner: 39 grams of methylglucamine of the formula:

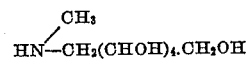

are dissolved in 50 cc. of water (glucamine, ethylglucamine etc. can be used in the same manner) and 11.6 grams of chloracetylchloride are added, while cooling. The whole is agitated until the odor of the chloracetylchloride can no longer be detected. The solution is dried in a vacuum and 200 cc. of methylalcohol are added to the residue. On cooling the hydrochloride of methylglucamine crystallizes. It is separated by filtration and the filtrate which contains the chloracetic acid methylgluconamide is concentrated in a vacuum.

(2) 25.5 grams of methylglucamine dissolved in 50 cc. of water are treated in portions with 8.5 grams of β-chlorpropionic acid chloride as described in Example 1 and the whole is then caused to react as described in Example 1 with potassium disulphide prepared from 2.5 grams of potassium methylate. A viscous sirup is obtained which does not crystallize. 4 grams of this β-disulphidepropionyl methylglucamide are dissolved in 10 cc. of water and a solution of 1.7 grams of auric chloride in 7 cc. of water is added. The solution which is at first dark rapidly becomes light, is then filtered until clear and poured into alcohol. The gold compound separates in the form of a light yellow powder; it is filtered with suction and washed with alcohol and ether. The yield amounts to 1.8 grams.

We claim:

1. The process which comprises causing an auric halide in an aqueous solution to act upon a compound of the following formula:

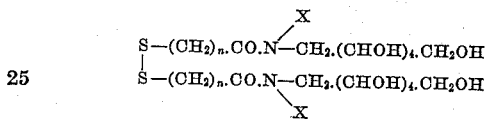

wherein $n$ stands for 1 or 2 and X stands for a member of the group consisting of hydrogen and a lower alkyl.

2. The process which comprises causing an auric halide in an aqueous solution to act upon a compound of the following formula:

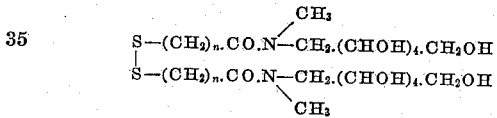

wherein $n$ stands for 1 or 2.

3. The process which comprises causing auric chloride in an aqueous solution to act upon a compound of the following formula:

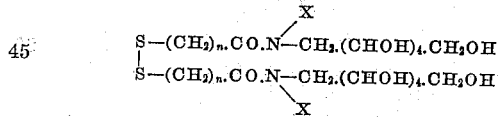

wherein $n$ stands for 1 or 2 and X stands for a member of the group consisting of hydrogen and a lower alkyl.

4. The process which comprises causing auric chloride in an aqueous solution to act upon a compound of the following formula:

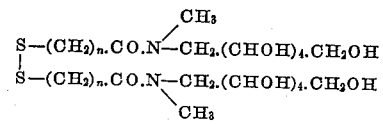

wherein $n$ stands for 1 or 2.

5. As new products, the compounds which are identical with those formed by causing an auric halide in an aqueous solution to act upon a compound of the following formula:

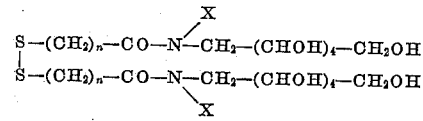

wherein $n$ stands for 1 or 2 and X stands for a member of the group consisting of hydrogen and a lower alkyl, said compounds being light yellow powders readily soluble in water but insoluble in ether.

6. As a new product, the compound which is identical with that formed by causing an auric halide in aqueous solution to act upon a compound of the following formula:

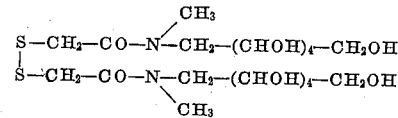

said compound being a light yellow powder readily soluble in water but insoluble in ether.

7. As a new product, the compound which is identical with that formed by causing an auric halide in aqueous solution to act upon a compound of the following formula:

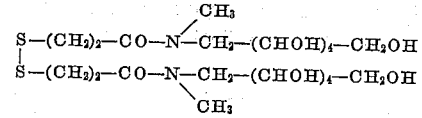

said compound being a light yellow powder readily soluble in water but insoluble in ether.

MAX BOCKMÜHL.
GUSTAV EHRHART.